United States Patent
Sugimoto

(10) Patent No.: US 11,417,933 B2
(45) Date of Patent: Aug. 16, 2022

(54) NONAQUEOUS SECONDARY BATTERY FUNCTIONAL LAYER COMPOSITION, NONAQUEOUS SECONDARY BATTERY FUNCTIONAL LAYER, AND NONAQUEOUS SECONDARY BATTERY

(71) Applicant: ZEON CORPORATION, Tokyo (JP)

(72) Inventor: Takumi Sugimoto, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 200 days.

(21) Appl. No.: 16/323,324

(22) PCT Filed: Jul. 14, 2017

(86) PCT No.: PCT/JP2017/025765
§ 371 (c)(1),
(2) Date: Feb. 5, 2019

(87) PCT Pub. No.: WO2018/034093
PCT Pub. Date: Feb. 22, 2018

(65) Prior Publication Data
US 2020/0052270 A1    Feb. 13, 2020

(30) Foreign Application Priority Data

Aug. 17, 2016  (JP) .............................. JP2016-159810

(51) Int. Cl.
| H01M 50/46 | (2021.01) |
| H01M 50/443 | (2021.01) |
| H01M 10/0525 | (2010.01) |
| H01M 4/13 | (2010.01) |
| H01M 50/449 | (2021.01) |

(52) U.S. Cl.
CPC ........... *H01M 50/461* (2021.01); *H01M 4/13* (2013.01); *H01M 10/0525* (2013.01); *H01M 50/443* (2021.01); *H01M 50/449* (2021.01)

(58) Field of Classification Search
CPC .. H01M 50/461; H01M 4/13; H01M 10/0525; H01M 50/443; H01M 50/449
See application file for complete search history.

(56) References Cited

U.S. PATENT DOCUMENTS

| 2008/0206645 A1 | 8/2008 | Takahashi |
| 2011/0020709 A1 | 1/2011 | Fukumine et al. |
| 2016/0079007 A1 | 3/2016 | Otsuka et al. |
| 2016/0141575 A1 * | 5/2016 | Sasaki ................ H01M 2/1673 |
| | | 429/144 |
| 2016/0248086 A1 * | 8/2016 | Ohsawa ............... H01M 4/583 |
| 2016/0351873 A1 | 12/2016 | Sasaki |
| 2017/0200932 A1 | 7/2017 | Sasaki et al. |
| 2018/0130987 A1 * | 5/2018 | Takamatsu ............. H01M 4/13 |
| 2019/0221807 A1 * | 7/2019 | Oura ..................... H01M 4/628 |

FOREIGN PATENT DOCUMENTS

| CN | 105283979 A | 1/2016 | |
| JP | 2008210686 A | 9/2008 | |
| JP | 2013145763 A | 7/2013 | |
| JP | 2014063754 A | 4/2014 | |
| JP | 2015185353 A | 10/2015 | |
| KR | 1020150135207 A | 12/2015 | |
| WO | WO-2015005151 A1 * | 1/2015 | ............ B32B 27/24 |
| WO | 2015145967 A1 | 10/2015 | |
| WO | 2015198534 A1 | 12/2015 | |
| WO | 2016084330 A1 | 6/2016 | |
| WO | WO-2017221572 A1 * | 12/2017 | ........ H01M 10/0525 |

OTHER PUBLICATIONS

Nov. 29, 2019, the Extended European Search Report issued by the European Patent Office in the corresponding European Patent Application No. 17841321.7.
Aug. 8, 2017, International Search Report issued in the International Patent Application No. PCT/JP2017/025765.
Feb. 19, 2019, International Preliminary Report on Patentability issued in the International Patent Application No. PCT/JP2017/025765.

* cited by examiner

*Primary Examiner* — Cynthia H Kelly
*Assistant Examiner* — Jenna Shulman
(74) *Attorney, Agent, or Firm* — Kenja IP Law PC

(57) ABSTRACT

A composition for a non-aqueous secondary battery functional layer including a particulate polymer, wherein the particulate polymer is a copolymer containing 20% by weight or more and 80% by weight or less of an aromatic monovinyl monomer unit; and 0.01% by weight or more and 2% by weight or less of a polyvalent ethylenically unsaturated crosslinkable monomer unit, a volume-average particle diameter D of the particulate polymer is 0.5 μm or more and 5 μm or less, and a swelling degree of the particulate polymer to an electrolyte solution is more than 1 time and 3 times or less; and a non-aqueous secondary battery including the same.

8 Claims, No Drawings

NONAQUEOUS SECONDARY BATTERY FUNCTIONAL LAYER COMPOSITION, NONAQUEOUS SECONDARY BATTERY FUNCTIONAL LAYER, AND NONAQUEOUS SECONDARY BATTERY

FIELD

The present invention relates to a composition for a non-aqueous secondary battery functional layer, a functional layer for a non-aqueous secondary battery, and a non-aqueous secondary battery.

BACKGROUND

A secondary battery is a generic name for batteries having characteristics that they are capable of being repeatedly charged and discharged. The secondary battery generally includes a positive electrode, a negative electrode, a separator, an electrolyte solution, and a sheathing material. The electrolyte solution is filled into a space formed by the sheathing material. A secondary battery including a non-aqueous electrolyte solution as the electrolyte solution is generally called a non-aqueous secondary battery.

The separator is disposed between the positive electrode and the negative electrode. As the separator, a separator having a separator substrate and a functional layer for a non-aqueous secondary battery formed on the separator substrate is known (for example, see Patent Literatures 1 and 2). This functional layer for a non-aqueous secondary battery may contain a particulate polymer having adhesiveness. The functional layer for a non-aqueous secondary battery may be formed using a composition for non-aqueous battery functional layers which contains such a particulate polymer.

The functional layer for a non-aqueous secondary battery may be a layer having adhesiveness. When the functional layer for a non-aqueous secondary battery having adhesiveness is placed between the separator substrate and the electrode (the positive electrode, the negative electrode, or both), the adhesion between the separator substrate and the electrode can be achieved.

CITATION LIST

Patent Literature

Patent Literature 1: International Publication No. 2015/145967 (corresponding publication: specification of U.S. Patent Application Publication No. 2016/351873)

Patent Literature 2: Japanese Patent Application Laid-Open No. 2008-210686 A (corresponding publication: specification of U.S. Patent Application Publication No. 2008/206645)

SUMMARY

Technical Problem

However, the non-aqueous secondary battery is demanded to have further improved performance. Therefore, further improvement of the adhesiveness of the functional layer is demanded.

Also, when the function of the functional layer for a non-aqueous secondary battery is high, liquid supply to the electrode, that is, distribution of the electrolytic solution to the electrode inside the secondary battery, can become insufficient, which contrarily reduces battery performance. For example, life properties (life in repeated uses) may decrease, and/or low-temperature output properties (properties of being capable of outputting voltages closer to normal temperature even at low temperatures) may decrease.

Furthermore, when a functional layer containing the particulate polymer is used as the functional layer for a non-aqueous secondary battery, blocking of the functional layer for a non-aqueous secondary battery occurs, and handling becomes difficult in some cases.

To address this concern, an object of the present invention is to provide: a functional layer for a non-aqueous secondary battery which can express high adhesiveness, provide a non-aqueous secondary battery being excellent in performance such as life properties and low-temperature output properties, and have a facilitated handleability; a composition for a non-aqueous secondary battery functional layer which enables formation of such a functional layer for a non-aqueous secondary battery; and a non-aqueous secondary battery including the functional layer for a non-aqueous secondary battery and having improved performance such as life properties and low-temperature output properties.

Solution to Problem

The present inventor conducted extensive studies for the purpose of solving the aforementioned problem. As a result, the present inventor has found that when a particulate polymer constituting the composition for a non-aqueous secondary battery functional layer is adjusted so as to contain specific monomer units at a specific range of ratios and have a specific range of particle diameters and a specific swelling degree, the performance of the non-aqueous secondary battery can be improved while the adhesiveness of the functional layer for a non-aqueous secondary battery is enhanced, and furthermore, blocking of the functional layer for a non-aqueous secondary battery can be suppressed. The present invention has been achieved on the basis of such knowledge.

That is, the present invention is as follows.

(1) A composition for a non-aqueous secondary battery functional layer comprising a particulate polymer, wherein
the particulate polymer is a copolymer containing
20% by weight or more and 80% by weight or less of an aromatic monovinyl monomer unit; and
0.01% by weight or more and 2% by weight or less of a polyvalent ethylenically unsaturated crosslinkable monomer unit,
a volume-average particle diameter D of the particulate polymer is 0.5 µm or more and 5 µm or less, and
a swelling degree of the particulate polymer to an electrolyte solution is more than 1 time and 3 times or less.
(2) The composition for a non-aqueous secondary battery functional layer according to (1), wherein an elution amount of the particulate polymer to the electrolyte solution is 0.01% by weight or more and 10% by weight or less.
(3) The composition for a non-aqueous secondary battery functional layer according to (1) or (2), further comprising inorganic particles.
(4) A functional layer for a non-aqueous secondary battery formed using the composition for a non-aqueous secondary battery functional layer according to any one of (1) to (3).
(5) A non-aqueous secondary battery comprising a positive electrode, a negative electrode, a separator, and an electrolyte, wherein
one or more of the positive electrode, the negative electrode, and the separator have the functional layer for a non-aqueous secondary battery according to (4).

(6) A functional layer for a non-aqueous secondary battery comprising a particulate polymer, wherein the particulate polymer is a copolymer containing 20% by weight or more and 80% by weight or less of an aromatic monovinyl monomer unit; and 0.01% by weight or more and 2% by weight or less of a polyvalent ethylenically unsaturated crosslinkable monomer unit, a volume-average particle diameter of the particulate polymer is 0.5 μm or more and 5 μm or less, and a swelling degree of the particulate polymer to a specific electrolyte solution is more than 1 time and 3 times or less.

Advantageous Effects of the Invention

According to the present invention, a functional layer for a non-aqueous secondary battery which can express high adhesiveness, provide a non-aqueous secondary battery being excellent in performance such as life properties and low-temperature output properties, and have a facilitated handleability; a composition for a non-aqueous secondary battery functional layer which enables formation of such a functional layer for a non-aqueous secondary battery; and a non-aqueous secondary battery including the functional layer for a non-aqueous secondary battery and having improved performance such as life properties and low-temperature output properties can be provided.

DESCRIPTION OF EMBODIMENTS

Hereinafter, the present invention will be described in detail with reference to embodiments and examples. However, the present invention is not limited to the following embodiments and examples, and may be freely modified for implementation without departing from the scope of claims of the present invention and the scope of their equivalents.

In the present application, the expression "(meth)acryl-" means "acryl-", "methacryl-" or a combination of these. For example, (meth)acrylic acid means acrylic acid, methacrylic acid, or a combination of these. In addition, (meth)acrylate means acrylate, methacrylate, or a combination of these. Further, (meth)acrylonitrile means acrylonitrile, methacrylonitrile, or a combination of these.

In the present application, the term "monomer unit" refers to a structural unit having a structure formed by certain polymerization. For example, a (meth)acrylic acid ester monomer unit refers to a structural unit having a structure formed by polymerizing a (meth)acrylic acid ester monomer. A (meth)acrylonitrile monomer unit refers to a structural unit having a structure formed by polymerizing (meth)acrylonitrile.

[1. Composition for Non-Aqueous Secondary Battery Functional Layer]

The composition for a non-aqueous secondary battery functional layer includes a specific particulate polymer.

[1.1. Particulate Polymer]

The particulate polymer is a polymer having a particulate shape. The particulate polymer can maintain the particulate shape in a composition for a functional layer and in a functional layer formed using the composition for a functional layer.

The particulate polymer is a copolymer containing an aromatic monovinyl monomer unit and a polyvalent ethylenically unsaturated crosslinkable monomer unit. The structure of such a copolymer is not particularly limited. The copolymer may be any of a block copolymer, a graft copolymer, and a random copolymer, but is preferably a random copolymer.

[1.2. Aromatic Monovinyl Monomer Unit]

Examples of the aromatic monovinyl monomer capable of forming the aromatic monovinyl monomer unit may include styrene, styrenesulfonic acid and salts thereof (for example, sodium styrenesulfonate), α-methylstyrene, vinyltoluene, and 4-(tert-butoxy)styrene. Among these, styrene and sodium styrenesulfonate are preferable, and styrene is more preferable. One type of these may be solely used, and two or more types thereof may also be used in combination at any ratio.

The content ratio of the aromatic monovinyl monomer unit in the particulate polymer is preferably 20% by weight or more, more preferably 40% by weight or more, and further preferably 60% by weight or more, and is preferably 80% by weight or less, more preferably 77% by weight or less, further preferably 75% by weight or less. When the content ratio of the aromatic monovinyl monomer unit in the particulate polymer is equal to or more than the aforementioned lower limit value, the elution amount of the particulate polymer into the electrolyte solution can be reduced, thereby making the low-temperature properties of the non-aqueous secondary battery excellent. Furthermore, strength of the particulate polymer can be expressed, thereby enabling suppression of blocking of the functional layer while enhancing the adhesion. When the content ratio of the aromatic monovinyl monomer unit in the particulate polymer is equal to or less than the aforementioned upper limit value, adhesiveness by the particulate polymer can be expressed.

[1.3. Polyvalent Ethylenically Unsaturated Crosslinkable Monomer Unit]

The polyvalent ethylenically unsaturated crosslinkable monomer capable of forming the polyvalent ethylenically unsaturated crosslinkable monomer unit may be a compound having two or more ethylenically unsaturated bonds. Examples of the polyvalent ethylenically unsaturated crosslinkable monomer may include polyfunctional (meth)acrylates such as allyl (meth)acrylate, ethylene glycol di(meth)acrylate, diethylene glycol di(meth)acrylate, triethylene glycol di(meth)acrylate, tetraethylene glycol di(meth)acrylate, and trimethylol propane-tri(meth)acrylate; polyfunctional allyl/vinyl ethers such as dipropylene glycol diallyl ether, polyglycol diallyl ether, triethylene glycol divinyl ether, hydroquinone diallyl ether, and tetraallyloxyethane; and divinylbenzene. Among these, ethylene glycol di(meth)acrylate and allyl (meth)acrylate are preferable, and ethylene glycol di(meth)acrylate is more preferable. One type of these may be solely used, and two or more types thereof may also be used in combination at any ratio.

The content ratio of the polyvalent ethylenically unsaturated crosslinkable monomer unit in the particulate polymer is preferably 0.01% by weight or more, more preferably 0.05% by weight or more, and further preferably 0.1% by weight or more, and is preferably 2% by weight or less, more preferably 1.5% by weight or less, further preferably 1% by weight or less. When the content ratio of the polyvalent ethylenically unsaturated crosslinkable monomer unit in the particulate polymer is equal to or more than the aforementioned lower limit value, the elution amount of the particulate polymer into the electrolyte solution can be reduced, whereby the low-temperature properties of the non-aqueous secondary battery can be made excellent. Furthermore, strength of the particulate polymer can be expressed, thereby enabling suppression of the blocking of the functional layer while enhancing the adhesion. When the content ratio of the polyvalent ethylenically unsaturated crosslinkable monomer unit in the particulate polymer is equal to or less than the aforementioned upper limit value, adhesiveness by the particulate polymer can be expressed.

[Other Monomer Units]

The particulate polymer may contain an optional unit in addition to the aromatic monovinyl monomer unit and the polyvalent ethylenically unsaturated crosslinkable monomer unit. Examples of the optional monomer may include a (meth)acrylic acid alkyl ester monomer unit and an acidic group-containing monomer unit.

As the (meth)acrylic acid alkyl ester monomer capable of forming the (meth)acrylic acid alkyl ester monomer unit, a (meth)acrylic acid alkyl ester monomer having one polymerizable unsaturated group per molecule may be used. Examples of the (meth)acrylic acid alkyl ester monomer may include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate. Among these, from the viewpoint of enhancing adhesiveness of the functional layer for a non-aqueous secondary battery before and after immersion in an electrolyte solution and improving the life properties of the non-aqueous secondary battery, methyl methacrylate, 2-ethylhexyl acrylate, ethyl acrylate, and butyl acrylate are preferable, and methyl methacrylate and butyl acrylate are more preferable. With such monomers, desired properties can be imparted to the particulate polymer. As the (meth)acrylic acid alkyl ester monomer, one type thereof may be solely used, and two or more types thereof may also be used in combination at any ratio.

The content ratio of the (meth)acrylic acid alkyl ester monomer unit in the particulate polymer is preferably 5% by weight or more, more preferably 7% by weight or more, and further preferably 10% by weight or more, and is preferably 70% by weight or less, more preferably 60% by weight or less, and further preferably 50% by weight or less. When the content ratio of the (meth)acrylic acid alkyl ester monomer unit in the particulate polymer is equal to or more than the aforementioned lower limit value, the elution amount of the particulate polymer into the electrolyte solution can be reduced, whereby the low-temperature properties of the non-aqueous secondary battery can be made excellent. On the other hand, when the content ratio of the (meth)acrylic acid alkyl ester monomer unit in the particulate polymer is equal to or less than the aforementioned upper limit value, sufficient adhesiveness can be expressed.

Examples of the acidic group-containing monomer capable of forming the acidic group-containing monomer unit may include a carboxylic acid group-containing monomer, a sulfonic acid group-containing monomer, and a phosphoric acid group-containing monomer. Among these, a carboxylic acid group-containing monomer is preferable.

Examples of the carboxylic acid group-containing monomer may include an ethylenically unsaturated monocarboxylic acid and derivatives thereof, and an ethylenically unsaturated dicarboxylic acid and acid anhydrides thereof, and derivatives thereof.

Examples of the ethylenically unsaturated monocarboxylic acid may include acrylic acid, methacrylic acid, and crotonic acid. Examples of the derivatives of the ethylenically unsaturated monocarboxylic acid may include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of the ethylenically unsaturated dicarboxylic acid may include maleic acid, fumaric acid, itaconic acid, and mesaconic acid. Examples of the acid anhydrides of the ethylenically unsaturated dicarboxylic acid may include maleic anhydride, acrylic anhydride, methyl maleic anhydride, and dimethyl maleic anhydride. Examples of the derivatives of the ethylenically unsaturated dicarboxylic acid may include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleate.

Among these, from the viewpoint of making the properties of the particulate polymer favorable, a carboxylic acid group-containing monomer is preferable as the acidic group-containing monomer. Acrylic acid, methacrylic acid, and itaconic acid are more preferable, acrylic acid and methacrylic acid are further preferable, and methacrylic acid is particularly preferable. As the acidic group-containing monomer, one type thereof may be solely used, and two or more types thereof may also be used in combination at any ratio.

The content ratio of the acidic group-containing monomer unit in the particulate polymer is preferably 0.1% by weight or more, more preferably 0.3% by weight or more, and further preferably 0.5% by weight or more, and is preferably 20% by weight or less, more preferably 10% by weight or less, and further preferably 5% by weight or less. When the content ratio of the acidic group-containing monomer unit in the particulate polymer falls within the aforementioned range, the properties of the particulate polymer can be made favorable.

[1.5. Volume-Average Particle Diameter D of Particulate Polymer]

The volume-average particle diameter D of the particulate polymer is preferably 0.5 μm or more, and is preferably 5 μm or less, more preferably 2 μm or less, and further preferably 1.5 μm or less. When the volume-average particle diameter D is equal to or more than the aforementioned lower limit value, favorable adhesion between the functional layer and a layer in contact with the functional layer can be obtained by the particulate polymer exposed on the surface. When the volume-average particle diameter D is equal to or less than the aforementioned upper limit value, thickness of the functional layer can be reduced, and furthermore, an increased capacity of the non-aqueous secondary battery can be achieved.

In the present application, the volume-average particle diameter D is a volume-average particle diameter D50 in a particle size distribution (based on volume). The volume-average particle diameter D50 represents a particle diameter (median diameter) at a cumulative volume from the small diameter side of 50% in a particle size distribution (based on volume). The particle size distribution may be measured by a commercially available particle size distribution measuring device. Specifically, the particle size distribution may be measured using a laser diffraction type particle diameter distribution measuring device which will be described in Evaluation items of Examples described in the present application.

[1.6. Glass Transition Temperature of Particulate Polymer]

It is preferable that the particulate shape of the particulate polymer is at least partly maintained in the preparation of the composition for a functional layer, in the formation of the functional layer using the composition for a functional layer, and in the use of the functional layer in the secondary battery. Therefore, the glass transition temperature of the particulate polymer is preferably at a certain level or higher. Specifically, the glass transition temperature of the particulate polymer is preferably 20° C. or higher, more preferably 30° C. or higher, and further preferably 35° C. or higher. The upper limit of the glass transition temperature of the particulate polymer is not particularly limited to, and may be usually 65° C. or lower. In the present application, the glass transition temperature may be measured in accordance with JIS K7121, using a commercially available differential scanning calorimeter or the like. Specifically, the glass transition temperature may be measured by the following procedure. First, the subject to be measured is molded as a film having a thickness of 1±0.3 mm. This film is dried in a hot air oven at 120° C. for 1 hour. After that, the glass transition temperature (° C.) of the dried film as a sample is measured in accordance with JIS K7121, at a measurement temperature of −100° C. to 180° C. and a rate of temperature increase of 5° C./min, using a differential scanning calorimeter (DSC6220SII, manufactured by NanoTechnology Inc.).

When the particulate polymer is a random copolymer, the measured glass transition temperature is determined as one point. On the other hand, when the particulate polymer is a copolymer other than a random copolymer, such as a block copolymer or a graft copolymer, the measured glass transition temperature is indicated by a plurality of values. When the particulate polymer is a random copolymer, the polymer can be homogenized, durability of the particulate polymer against the electrolyte solution can be enhanced, and dispersibility in the composition for a non-aqueous secondary battery functional layer can also be enhanced.

[1.7. Swelling Degree and Elution Amount of Particulate Polymer to Electrolyte Solution]

It is preferable that the swelling degree of the particulate polymer to the electrolyte solution is within a specific range. The swelling degree to the electrolyte solution is the ratio of the weight change of a film that has been formed by molding of the particulate polymer, the weight change being as a result of immersion of the film in a specific electrolyte solution at 60° C. for 72 hours. The specific measurement method of the swelling degree is as follows. That is, about 0.2 g of the dried particulate polymer is pressed for 2 minutes under the press conditions of 200° C. and 5 MPa to obtain a film. The obtained film is cut into a 1-cm square to have a test piece. The weight W0 of this test piece is measured. After that, the test piece is immersed in a specific electrolyte solution at 60° C. for 72 hours. After that, the test piece is taken out of the electrolyte solution, and the electrolyte solution on the surface is wiped off. Then, the weight W1 of the test piece is measured. From the obtained values of the weights W0 and W1, the swelling degree S (times) of the particulate polymer is calculated from formula S=W1/W0. As the aforementioned specific electrolyte solution, a non-aqueous electrolyte solution obtained by dissolving a supporting electrolyte at a concentration of 1 mol/L in a specific mixed solvent is used. As the specific mixed solvent, a mixture of ethylene carbonate (EC), diethyl carbonate (DEC), and vinylene carbonate (VC) with a volume ratio: EC/DEC/VC=68.5/30/1.5 is used. As the supporting electrolyte, $LiPF_6$ is used.

The swelling degree S of the particulate polymer is more than 1 time, preferably 1.5 times or more, and more preferably 1.75 times or more, and is 3 times or less, preferably 2.5 times or less, and more preferably 2.25 times or less. The polymer having such a desired swelling degree may be obtained by appropriately adjusting the composition of its monomer units. When the swelling degree S of the particulate polymer is equal to or less than the aforementioned upper limit value, elution of the components of the particulate polymer can be suppressed, and battery properties such as low temperature properties can be improved. When the swelling degree S of the particulate polymer is equal to or more than the aforementioned lower limit value, the ability to supply the electrolyte solution to the electrode can be exerted, and battery properties such as life properties can be improved.

It is preferable that the elution amount of the particulate polymer to the electrolyte solution is within a specific range. The elution amount to the electrolyte solution refers to an amount of the particulate polymer eluting to the electrolyte solution as a result of swelling. The elution amount may be calculated by drying the test piece after the aforementioned measurement of the swelling degree, measuring the dry weight, and comparing the measured dry weight to the weight before the immersion. The specific measurement method thereof is as follows. That is, the test piece after the measurement of the swelling degree is washed with methanol 5 times, dried, and measured for the weight W2 of the test piece after drying. From the values of the weights W0 and W2, the elution amount X (%) is calculated from formula $X=(W2/W0)\times 100$.

The elution amount X of the particulate polymer is preferably 0.01% by weight or more, and is preferably 10% by weight or less, more preferably 5% by weight or less, and further more preferably 1% by weight or less. When the elution amount X of the particulate polymer is equal to or less than the aforementioned upper limit value, low temperature properties of the secondary battery can be improved. When the elution amount X of the particulate polymer is equal to or more than the aforementioned lower limit value, coating of the particulate polymer on the electrode mixture layer can be achieved, and life properties of the secondary battery can be improved.

[1.8. Content Ratio of Particulate Polymer]

The content ratio of the particulate polymer in 100% by weight of the solid content of the composition for a functional layer is preferably 3% by weight or more, more preferably 4% by weight or more, and particularly preferably 5% by weight or more, and is preferably 95% by weight or less, more preferably 90% by weight or less, and particularly preferably 85% by weight or less. In the present application, the solid content of the composition for a functional layer refers to components remained in the functional layer after the functional layer has been formed using the composition for a functional layer through steps including a drying step, and usually comes to be a sum of all the components other than a solvent. When the content ratio of the particulate polymer falls within the aforementioned range, the composition for a functional layer prepared in a slurry state can have properties suitable for coating.

[1.9. Preparation of Particulate Polymer]

The particulate polymer may be prepared by copolymerizing the plurality of types of monomers described above.

The ratio of the monomers for preparing the copolymer may be usually the same as the ratio of the monomer units in the particulate polymer.

The manner of polymerization of the particulate polymer is not particularly limited. Examples of the polymerization method to be used may include a solution polymerization method, a suspension polymerization method, a bulk polymerization method, and an emulsion polymerization method. As the polymerization reaction, addition polymerization such as ion polymerization, radical polymerization, and living radical polymerization may be used. Furthermore, as the emulsifier, dispersant, polymerization initiator, and polymerization auxiliary used for the polymerization, commonly used ones may be used. Using amounts thereof may also be commonly used amounts.

For preparing the particulate polymer as a random copolymer, the polymerizable monomer in the monomer composition may be in a state of a polymerizable monomer rather than in a state of an oligomer that has been polymerized to some extent, because thereby generation of a block copolymer and a graft copolymer can be suppressed.

The volume-average particle diameter D of the particulate polymer may be adjusted by any known method. For example, the volume-average particle diameter D of the particulate polymer may be adjusted by: changing the type and amount of the emulsifier and the amount of the polymerization initiator; changing the reaction conditions of the polymerization reaction; extracting the particulate polymer having a necessary particle diameter range from the polymer obtained through the polymerization reaction; or adding an appropriate amount of the monomer in the presence of seed particles for polymerization.

[1.10. Dispersion Medium]

The composition for a non-aqueous secondary battery functional layer of the present invention may contain optional components in addition to the particulate polymer. For example, the composition for a non-aqueous secondary battery functional layer of the present invention may contain a dispersion medium. When the composition for a non-aqueous secondary battery functional layer of the present invention contains a dispersion medium, the composition can have a property of a slurry. Hereinafter, the composition for a non-aqueous secondary battery functional layer of the present invention having the property of a slurry may be referred to as a "slurry composition for a functional layer". In the formation of the functional layer using the slurry composition for a functional layer including the step of drying, the dispersion medium is volatilized, whereby a functional layer formed of the solid content of the slurry composition for a functional layer can be obtained.

As the dispersion medium, any medium which can be volatilized in the formation of the functional layer, has a low tendency to dissolve the particulate polymer, and can maintain the dispersed state of the particulate polymer may be used. As the dispersion medium, an aqueous medium is preferable. An aqueous medium is water or a mixture of water and a medium other than water. When an aqueous medium is employed as the dispersion medium, environmental load can be reduced, and handling of the slurry composition for a functional layer can be facilitated.

Examples of the medium which may be used in combination with water in the aqueous medium may include a cyclic aliphatic hydrocarbon compound such as cyclopentane and cyclohexane; an aromatic hydrocarbon compound such as toluene and xylene; a ketone compound such as ethyl methyl ketone and cyclohexanone; an ester compound such as ethyl acetate, butyl acetate, γ-butyrolactone, and ε-caprolactone; a nitrile compound such as acetonitrile and propionitrile; an ether compound such as tetrahydrofuran and ethylene glycol diethyl ether; an alcohol compound such as methanol, ethanol, isopropanol, ethylene glycol, and ethylene glycol monomethyl ether; and an amide compound such as N-methylpyrrolidone (NMP) and N,N-dimethylformamide. One type of these may be solely used, and two or more types thereof may also be used in combination at any ratio. The amount of the medium other than water is preferably 5 parts by weight or less relative to 100 parts by weight of water.

It is preferable that the amount of the dispersion medium in the slurry composition for a functional layer is set so that the solid content concentration of the slurry composition for a functional layer falls within a desired range. The specific solid content concentration of the slurry composition for a functional layer is preferably 10% by weight or more, more preferably 15% by weight or more, and further preferably 20% by weight or more, and is preferably 80% by weight or less, more preferably 75% by weight or less, further more preferably 70% by weight or less, and particularly preferably 65% by weight or less. When the solid content concentration falls within the aforementioned range, the slurry composition for a functional layer can have properties suitable for the coating and drying steps.

[1.11. Inorganic Particles]

The composition for a non-aqueous secondary battery functional layer of the present invention may contain inorganic particles as an optional component. The inorganic particles are particles of an inorganic compound. The inorganic particle does not dissolve in a dispersion medium that may be contained in the composition for a functional layer nor in a non-aqueous electrolyte solution of the non-aqueous secondary battery, and can maintain its shape even in the dispersion medium and the non-aqueous electrolyte solution.

The inorganic compound constituting the inorganic particles is preferably a material which stably exists in the use environment of the non-aqueous secondary battery and is electrochemically stable. From such a viewpoint, preferable examples of the inorganic compound may include: oxide particles such as aluminum oxide (alumina), hydrated aluminum oxide (boehmite), silicon oxide, magnesium oxide (magnesia), calcium oxide, titanium oxide (titania), $BaTiO_3$, ZrO, and alumina-silica composite oxide; nitride particles such as aluminum nitride and boron nitride; covalent crystal particles such as silicon and diamond; poorly-soluble ionic crystal particles such as barium sulfate, calcium fluoride, and barium fluoride; and clay fine particles such as talc and montmorillonite. The inorganic particle may be a particle obtained by subjecting the particle formed of these materials to a treatment such as element substitution, a surface treatment, and solid solution formation.

As the inorganic particles, one type thereof may be solely used, and two or more types thereof may also be used in combination.

[1.12. Volume-Average Particle Diameter of Inorganic Particles>

The volume-average particle diameter of the inorganic particles is preferably 0.1 μm or more, more preferably 0.20 μm or more, and further more preferably 0.30 μm or more, and is preferably 1.0 μm or less, more preferably 0.90 μm or less, and further more preferably 0.80 μm or less. When the volume-average particle diameter is equal to or more than the aforementioned lower limit value, the inorganic particles can be dispersed into a slurry state in the composition for a non-aqueous secondary battery functional layer. Also, the binding force between particles can be expressed in the functional layer, and thereby cohesive fracture when release force is applied to the functional layer can be suppressed, and adhesion of the functional layer can be improved. In addition, shrinkage when heat is applied to the functional layer can be reduced. When the volume-average particle diameter is equal to or less than the aforementioned upper limit value, the film thickness of the functional layer can be reduced, and in turn, an increased capacity of the non-aqueous secondary battery can be achieved. Also, when the composition for a functional layer is prepared in a slurry state, thixotropy can be imparted to the composition for a functional layer. As a result, floating of the particulate polymer and blocking of the functional layer can be suppressed.

As the inorganic particles, a commercially available product having a desired volume-average particle diameter as it is, or a product obtained by subjecting the commercially available product to a treatment if necessary, may be used. Alternatively, the commercially available product may be used after the volume-average particle diameter thereof has been adjusted to fall within a desired range by operations such as classification or crushing.

[1.3. Content Ratio of Inorganic Particles>

The content ratio of the inorganic particles in 100% by weight of the solid content of the composition for a functional layer is preferably 40% by weight or more, more preferably 50% by weight or more, and particularly preferably 60% by weight or more, and is preferably 99% by weight or less, more preferably 98% by weight or less, and particularly preferably 97% by weight or less. When the content ratio of the inorganic particles falls within the aforementioned range, properties of porosity can be imparted to the obtained functional layer to thereby render the functional layer a layer usable as a porous membrane. Furthermore, when the content ratio of the inorganic particles falls within the aforementioned range, the composition for a functional layer prepared into a slurry state can have properties suitable for coating.

[1.14. Weight Ratio between Inorganic Particles and Particulate Polymer]

In the composition for a non-aqueous secondary battery functional layer of the present invention, the weight ratio between the inorganic particles and the particulate polymer may be appropriately adjusted to obtain a composition for a functional layer and functional layer having desired properties. The ratio of the inorganic particles in 100% by weight in total of the inorganic particles and the particulate polymer is preferably 50% by weight or more, more preferably 55% by weight or more, and further more preferably 60% by weight or more, and is preferably 95% by weight or less, more preferably 90% by weight or less, and further more preferably 85% by weight or less. When the ratio of the inorganic particles in the total of the inorganic particles and the particulate polymer is equal to or more than the aforementioned lower limit value, blocking of the functional layer can be suppressed. Furthermore, there can be obtained a functional layer which is favorable both in the heat shrinkage resistance in a dried state and in the heat shrinkage resistance in the electrolyte solution (suppression of the shrinkage due to heating in the electrolyte solution in a state in which the functional layer adheres to another constituent element, the adhesion being effected by the conditions for pressing constituent elements such as an electrode and a separator during the production of a secondary battery). When the ratio of the inorganic particles in the total of the inorganic particles and the particulate polymer is equal to or less than the aforementioned upper limit value, the relative ratio of the particulate polymer can be increased, and as a result reliable adhesion of the functional layer to the electrode can be achieved.

[1.15. Binder for Functional Layer]

The composition for a non-aqueous secondary battery functional layer of the present invention may contain a binder for a functional layer as an optional component. The binder for a functional layer may be a binder having an ability to bind the components constituting the functional layer for a non-aqueous secondary battery to each other, in particular, an ability to bind the above-mentioned inorganic particles to each other and an ability to bind the inorganic particles and the particulate polymer to each other.

It is preferable that the glass transition temperature of the binder for a functional layer is lower than a certain level. Specifically, the glass transition temperature of the binder for a functional layer is preferably 10° C. or lower, more preferably 0° C. or lower, and further preferably −5° C. or lower. The lower limit of the glass transition temperature of the binder for a functional layer is not particularly limited, and may be usually −80° C. or higher. When the binder for a functional layer has such a low glass transition temperature, the binder for a functional layer melts in the step of producing the functional layer using the composition for a functional layer, so that the function of binding can be satisfactorily expressed.

As the binder for a functional layer, a polymer having desired properties may be used. Such a polymer may be a homopolymer composed of one type of a polymerization unit, and may also be a copolymer containing two or more types of polymerization units. From the viewpoint of adjusting properties such as the particle diameter, glass transition temperature, and ability as a binder to desired ranges, it is preferable that the binder is a copolymer.

As a particularly preferable aspect, the binder for a functional layer may contain a (meth)acrylic acid alkyl ester monomer unit. Examples of the (meth)acrylic acid alkyl ester monomer corresponding to the (meth)acrylic acid alkyl ester monomer unit may include acrylic acid alkyl esters such as methyl acrylate, ethyl acrylate, n-propyl acrylate, isopropyl acrylate, n-butyl acrylate, t-butyl acrylate, pentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, pentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, and stearyl methacrylate. One type of these may be solely used, and two or more types thereof may also be used in combination at any ratio. Among these, n-butyl acrylate and 2-ethylhexyl acrylate are preferable from the viewpoint of excellent flexibility.

The ratio of the (meth)acrylic acid alkyl ester monomer unit in the binder for a functional layer is preferably 50% by weight or more, more preferably 70% by weight or more, and particularly preferably 90% by weight or more, and is preferably 99% by weight or less, more preferably 98% by weight or less, and particularly preferably 97% by weight or less. When the ratio of the (meth)acrylic acid ester monomer unit is equal to or more than the aforementioned lower limit value, flexibility of the functional layer can be enhanced and adhesiveness of the functional layer can be enhanced. When the ratio of the (meth)acrylic acid alkyl ester monomer unit is equal to or less than the aforementioned upper limit value, rigidity of the functional layer can be enhanced, and adhesiveness of the functional layer can also be thereby enhanced.

The binder for a functional layer may contain an acidic group-containing monomer unit. As the acidic group-containing monomer unit, for example, those selected from the same range as those described as the usable units in the particulate polymer may be used. As the acidic group-containing monomer unit, one type thereof may be solely used, and two or more types thereof may also be used in combination at any ratio.

The ratio of the acidic group-containing monomer unit in the binder for a functional layer is preferably 0.2% by weight or more, more preferably 0.4% by weight or more, and particularly preferably 0.6% by weight or more, and is preferably 10.0% by weight or less, more preferably 6.0% by weight or less, and particularly preferably 4.0% by weight or less. When the ratio of the acidic group-containing monomer unit falls within the aforementioned range, cohesive fracture of the functional layer can be suppressed, and adhesiveness of the functional layer in the electrolyte solution can be improved.

In addition, the binder for a functional layer may contain a (meth)acrylonitrile monomer unit. When the binder contains the (meth)acrylonitrile monomer unit, the (meth)acrylonitrile monomer corresponding thereto for use may be acrylonitrile, may be methacrylonitrile, and may also be a combination of acrylonitrile and methacrylonitrile.

The ratio of the (meth)acrylonitrile monomer unit in the binder for a functional layer is preferably 0.2% by weight or more, more preferably 0.5% by weight or more, and particularly preferably 1.0% by weight or more, and is preferably 20.0% by weight or less, more preferably 10.0% by weight or less, and particularly preferably 5.0% by weight or less. When the ratio of the (meth)acrylonitrile monomer unit is equal to or more than the aforementioned lower limit value, the life of the non-aqueous secondary battery can be particularly extended. When the ratio of the (meth)acrylonitrile monomer unit is equal to or less than the aforementioned upper limit value, mechanical strength of the functional layer can be increased.

The binder for a functional layer may contain a crosslinkable monomer unit. Examples of the crosslinkable monomer corresponding to the crosslinkable monomer unit may include the same examples as those exemplified as the examples of the polyvalent ethylenically unsaturated crosslinkable monomers and the epoxy/N-methylol-based crosslinkable monomers in the description of the particulate polymer. As the crosslinkable monomer, one type thereof may be solely used, and two or more types thereof may also be used in combination at any ratio.

The ratio of the crosslinkable monomer unit in the binder for a functional layer is preferably 0.2% by weight or more, more preferably 0.6% by weight or more, and particularly preferably 1.0% by weight or more, and is preferably 5.0% by weight or less, more preferably 4.0% by weight or less, and particularly preferably 3.0% by weight or less. When the ratio of the crosslinkable monomer unit is equal to or more than the aforementioned lower limit value, mechanical strength of the functional layer can be increased. When the ratio thereof is equal to or less than the upper limit value, it is possible to prevent flexibility of the functional layer from being impaired to become brittle.

The binder for a functional layer may further contain an optional structural unit other than the structural units described above. Examples of the optional structural unit may include a structural unit having a structure formed by polymerizing styrene (styrene unit), and a structural unit having a structure formed by polymerizing butadiene (butadiene unit). As these optional structural units, one type thereof may be solely used, and two or more types thereof may also be used in combination at any ratio.

In the composition for a functional layer, the binder for a functional layer may be present in a state of being dissolved in a dispersion medium, and may also be present having a particulate shape. When the binder for a functional layer is a particulate polymer, the volume-average particle diameter of the particles of the binder for a functional layer is preferably 0.05 µm or more, more preferably 0.1 µm or more, and particularly preferably 0.15 µm or more, and is preferably 0.4 µm or less, more preferably 0.35 µm or less, and particularly preferably 0.3 µm or less. When the volume-average particle diameter of the binder for a functional layer is equal to or more than the lower limit value of the aforementioned range, dispersibility of the binder for a functional layer can be enhanced. When the volume-average particle diameter of the binder for a functional layer is equal to or less than the upper limit value, binding property of the functional layer can be enhanced. When the composition for a non-aqueous secondary battery functional layer of the present invention contains a particulate polymer as the binder for a functional layer, the volume-average particle diameter of the polymer having the shape of the particles with a glass transition temperature of 20° C. or higher is adopted as the volume-average particle diameter D in the composition for a non-aqueous secondary battery functional layer.

Examples of the method for producing the binder for a functional layer may include a solution polymerization method, a suspension polymerization method, and an emulsion polymerization method. Among these, an emulsion polymerization method and a suspension polymerization method are preferable because they can be performed in water and the resulting product therefrom as it is can be preferably used as a material of the slurry composition for a functional layer. When the binder for a functional layer is produced, it is preferable that the reaction system contains a dispersant. Usually, the binder for a functional layer is formed substantially by the polymer constituting the binder, but may be accompanied by an optional component such as additives used in the polymerization.

The amount of the binder for a functional layer is preferably 0.1 part by weight or more, and more preferably 0.2 part by weight or more, and is preferably 30 parts by weight or less, and more preferably 25 parts by weight or less, relative to 100 parts by weight of the total of the inorganic particles and the particulate polymer. When the amount of the binder for a functional layer is equal to or more than the lower limit value of the aforementioned range, expansion of a cell of a battery due to charging and discharging can be suppressed, so that the shape of the cell of the battery can be maintained for a long period of time. When the amount thereof is equal to or less than the upper limit value, a low-temperature output property of the secondary battery can be made favorable.

[1.16. Other Optional Component]

The composition for a non-aqueous secondary battery functional layer of the present invention may contain other optional components in addition to the components described above. The optional component is not particularly limited as long as it does not excessively give unpreferable influence to the battery reaction in the secondary battery using the functional layer. The types of the optional components may be one type, and may also be two or more types.

Examples of the optional component may include a wetting agent, a leveling agent, an electrolyte decomposition inhibitor, and a water-soluble polymer compound. The water-soluble polymer compound is not particularly limited, and examples thereof used may include those described in Japanese Patent Application Laid-Open No. 2014-063754 A.

[1.17. Preparation of Composition for Non-Aqueous Secondary Battery Functional Layer]

The method for preparing the composition for a functional layer is not particularly limited. The composition is usually obtained by mixing the above-mentioned particulate polymer, and optional components (dispersion medium, inorganic particles, binder for a functional layer, and other optional components) used if necessary. There is no particular limitation imposed on the mixing method, and mixing is performed using a disperser as a mixing apparatus in order to efficiently disperse respective components.

The disperser is preferably an apparatus capable of uniformly dispersing and mixing the aforementioned components. Examples thereof may include a ball mill, a sand mill, a pigment disperser, a crusher, an ultrasonic disperser, a homogenizer, and a planetary mixer.

[2. Functional Layer for Non-Aqueous Secondary Battery]

The functional layer for a non-aqueous secondary battery of the present invention is a layer formed using the composition for a non-aqueous secondary battery functional layer described above.

The functional layer for a non-aqueous secondary battery of the present invention may be formed by, for example, applying the above-mentioned composition for a functional layer onto a surface of an appropriate substrate to form a coating film, and then drying the formed coating film.

Since the functional layer for a non-aqueous secondary battery of the present invention is formed using the composition for a non-aqueous secondary battery functional layer of the present invention described above, excellent adhesiveness can be expressed. Therefore, in the case where the functional layer for a non-aqueous secondary battery of the present invention is provided as, for example, an adhesive layer for bonding other constituent elements, or a porous membrane for separating the positive electrode and the negative electrode, in the non-aqueous secondary battery, effects such as improvement of low temperature output properties and life properties of the non-aqueous secondary battery can be expressed.

[2.1. Substrate]

Herein, there is no limitation imposed on the substrate onto which the composition for a functional layer is applied. For example, a coating film of the composition for a functional layer may be formed on the surface of a release substrate, the coating film may be dried to form a functional layer, and the release substrate may be peeled off from the functional layer. By doing so, the functional layer peeled off from the release substrate may be used as an independent film for forming the battery member of the secondary battery. Specifically, the functional layer peeled off from the release substrate may be laminated on a separator substrate to form a separator including the functional layer. Alternatively, the functional layer peeled off from the release substrate may be laminated on an electrode substrate to form an electrode including the functional layer.

However, from the viewpoint of enhancing the production efficiency of the battery member by omitting the step of peeling off the functional layer, it is preferable to use a separator substrate or an electrode substrate as the substrate. The functional layer provided on the separator substrate and the electrode substrate can suitably function as a protective layer (heat resistant layer) for improving heat resistance, strength, and the like of the separator and the electrode.

[2.2. Separator Substrate]

The separator substrate is not particularly limited, and may be any separator substrate such as an organic separator substrate. The organic separator substrate is a porous member formed of an organic material. Examples of the organic separator substrate may include a micro-functional layer and nonwoven fabric that contain a polyolefin resin such as polyethylene or polypropylene, an aromatic polyamide resin, and the like. A micro-functional layer and nonwoven fabric made of polyethylene are preferable from the viewpoint of excellent strength. The thickness of the organic separator substrate may be any thickness, and is usually 0.5 µm or more, and preferably 5 µm or more, and is usually 40 µm or less, preferably 35 µm or less, and more preferably 30 µm or less.

[2.3. Electrode Substrate]

The electrode substrate (positive electrode substrate and negative electrode substrate) is not particularly limited, and may be a substrate including a current collector and an electrode mixture layer provided thereon.

Known methods may be adopted as the methods for forming a current collector, an electrode active material in an electrode mixture layer (positive electrode active material and negative electrode active material) and a binder for the electrode mixture layer (binder for the positive electrode mixture layer and binder for the negative electrode mixture layer), and an electrode mixture layer formed on the current collector. For example, those described in Japanese Patent Application Laid-Open No. 2013-145763 A may be adopted.

[2.4. Method for Forming Functional Layer for Non-Aqueous Secondary Battery]

As a method for forming a functional layer on a substrate such as a separator substrate and an electrode substrate, the following method may be mentioned.

(1) A method of applying the composition for a functional layer onto a surface of a separator substrate or an electrode substrate (in the case of the electrode substrate, a surface on the electrode mixture layer side, hereinafter the same) and then drying the same;

(2) A method of immersing a separator substrate or an electrode substrate in the composition for a functional layer and then drying the same; and (3) A method of producing a functional layer by applying the composition for a functional layer on a release substrate and drying the same, and transferring the obtained functional layer to the surface of a separator substrate or an electrode substrate;

Among these, the method (1) is particularly preferable because the film thickness of the functional layer can be easily controlled. Explaining in more detail, the method (1) includes a step of applying the composition for a functional layer onto the substrate (application step), and a step of drying the composition for a functional layer applied onto the substrate to form the functional layer (drying step).

[2.5. Application Step]

There is no particular limitation imposed on the method for applying the composition for a functional layer onto the substrate in the application step. Examples of the application method may include a doctor blade method, a reverse roll method, a direct roll method, a gravure method, an extrusion method, and a brush coating method.

[2.6. Drying Step]

The method for drying the composition for a functional layer on the substrate is not particularly limited, and a known method may be used. Examples of the drying method may include drying by warm air, hot air, or low humidity air, vacuum drying, and a drying method by irradiation with infrared rays, electron beams, or the like. The drying conditions are not particularly limited, and the drying temperature is preferably 50 to 100° C., and the drying time is preferably 5 to 30 minutes.

[2.7. Thickness of Functional Layer]

The thickness of the functional layer for a non-aqueous secondary battery of the present invention is preferably 0.01 µm or more, more preferably 0.1 µm or more, and further preferably 1 µm or more, and is preferably 20 µm or less, more preferably 10 µm or less, and further preferably 5 µm or less. When the thickness of the functional layer is 0.01 µm or more, strength of the functional layer can be sufficiently ensured. When the thickness is 20 µm or less, the diffusivity of the electrolyte solution can be ensured, and performance of the secondary battery using the functional layer can be improved.

[2.8. Properties of Functional Layer]

Since the functional layer for a non-aqueous secondary battery of the present invention contains a specific particulate polymer, the functional layer can be a layer having high adhesiveness. Specifically, adhesion with another constituent element can be easily achieved by the conditions for pressing constituent elements such as an electrode and a separator during the production of a secondary battery. More specifically, when the functional layer for a non-aqueous secondary battery is provided as a layer on the surface of the separator, a stacked body in which the electrode and the separator adhere to each other to be integrated can be obtained by stacking the electrode and the separator, and performing pressing under the conditions such as a load of 10 kN/m and a temperature of 80° C.

Since the functional layer for a non-aqueous secondary battery of the present invention contains a specific particulate polymer, the functional layer also can be a layer having suppressed blocking properties while having high adhesiveness as previously described. Specifically, the functional layer for a non-aqueous secondary battery can reduce the degree of the adhesion of the functional layers after the functional layers have been brought into intimate contact with each other by placing them in the state of being stacked under the conditions for storing the functional layers prior to the production of the secondary battery.

[3. Non-Aqueous Secondary Battery]

The non-aqueous secondary battery of the present invention includes the aforementioned functional layer for a non-aqueous secondary battery of the present invention. More specifically, the non-aqueous secondary battery of the present invention includes a positive electrode, a negative electrode, a separator, and an electrolyte solution. One or more of the positive electrode, the negative electrode, and the separator have the aforementioned functional layer for a non-aqueous secondary battery of the present invention. Since the non-aqueous secondary battery according to the present invention includes the functional layer formed using the composition for a functional layer of the present invention, it exerts excellent battery properties such as high life properties (life in repeated uses) and high low-temperature output properties (properties of being capable of outputting voltages closer to normal temperature even at low temperatures).

[3.1. Positive Electrode, Negative Electrode, and Separator]

When the non-aqueous secondary battery of the present invention includes, as the separator, a separator having the aforementioned functional layer for a non-aqueous secondary battery of the present invention, the separator may include a separator substrate and the functional layer provided on one or both of the surfaces of the separator substrate.

When the non-aqueous secondary battery of the present invention includes, as the electrode (positive electrode and/or negative electrode), an electrode having the aforementioned functional layer for a non-aqueous secondary battery of the present invention, the electrode may have a current collector, an electrode mixture layer provided on the current collector, and the functional layer provided on the electrode mixture layer. The electrode mixture layer and the functional layer may be provided on only one surface of the current collector, or may be provided on both surfaces.

When one of the positive electrode, the negative electrode, and the separator of the non-aqueous secondary battery of the present invention has the aforementioned functional layer for a non-aqueous secondary battery of the present invention, the others may have the functional layer for a non-aqueous secondary battery of the present invention, or may not have the functional layer for a non-aqueous secondary battery of the present invention. The electrode which does not have the functional layer for a non-aqueous secondary battery of the present invention may include, for example, a current collector and an electrode mixture layer provided on the current collector. The separator which does not have the functional layer for a non-aqueous secondary battery of the present invention may consist of, for example, a separator substrate.

[3.2. Electrolyte Solution]

The secondary battery of the present invention is a non-aqueous secondary battery, and therefore, a non-aqueous electrolyte solution is used as the electrolyte solution.

As the non-aqueous electrolyte solution, an organic electrolyte solution in which a supporting electrolyte is dissolved in an organic solvent is usually used. As the supporting electrolyte, for example, a lithium salt is used in a lithium ion secondary battery. Examples of the lithium salt may include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Among these, $LiPF_6$, $LiClO_4$, and $CF_3SO_3Li$ are preferable because they can be easily dissolved in a solvent and exhibits a high degree of dissociation. As the electrolyte, one type thereof may be solely used, and two or more types thereof may also be used in combination at any ratio. Usually, the higher the dissociation degree of the supporting electrolyte, the higher the lithium ion conductivity tends to be, so that the lithium ion conductivity can be adjusted by selecting the type of the supporting electrolyte.

As the organic solvent used for the electrolyte solution, an organic solvent capable of dissolving the supporting electrolyte may be appropriately selected. Examples of the organic solvent in a lithium ion secondary battery may include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethylsulfoxide. A mixture of these solvents may also be used. Among these, carbonates are preferable because of their high dielectric constant and wide stable electropotential region. Usually, the lower the viscosity of the solvent used, the higher the lithium ion conductivity tends to be, so that the lithium ion conductivity can be adjusted by selecting the type of the solvent.

The concentration of the electrolyte in the electrolyte solution may be adjusted as appropriate. Known additives may also be added to the electrolyte solution.

[3.3. Shape and Production Method of Non-Aqueous Secondary Battery]

The aforementioned non-aqueous secondary battery of the present invention may be produced by, for example, stacking a positive electrode and a negative electrode via a separator, winding or folding the stacked positive and negative electrodes if necessary, placing the electrodes in a battery container, and filling the battery container with an electrolyte solution and sealing the container. At least one member among the positive electrode, the negative electrode, and the separator is a member having the functional layer. Also, expanded metal, an overcurrent prevention element such as a fuse and a PTC element, a lead plate, and the like may be placed in the battery container if necessary to prevent the pressure increase inside the battery, and the overcharging and overdischarging. The shape of the battery may be any of coin-shape, button-shape, sheet-shape, cylindrical, rectangular, flat, and the like.

EXAMPLES

Hereinafter, the present invention will be specifically described by illustrating Examples. However, the present invention is not limited to the Examples described below. The present invention may be optionally modified for implementation without departing from the scope of claims of the present invention and the scope of their equivalents.

In the following description, "%" and "part" representing quantity are on the basis of weight, unless otherwise specified. The operation described below was performed under the conditions of normal temperature and normal pressure, unless otherwise specified.

[Evaluation Items]

(Volume-Average Particle Diameter D)

The volume-average particle diameter D of the particulate polymer was measured by a laser diffraction method. Specifically, an aqueous dispersion liquid (solid content concentration: 0.1% by weight) containing particles was prepared as a measurement sample, and the volume-average particle diameter of the particles was measured using a laser diffraction particle diameter distribution measuring device (manufactured by Beckman Coulter, Inc., product name: "LS-230"). More specifically, the particle diameter at a cumulative volume from the small diameter side of 50% in a particle size distribution (based on volume) obtained from the measurement result of the laser diffraction particle diameter distribution measuring device was adopted as the volume-average particle diameter (μm).

(Swelling Degree)

The aqueous dispersion liquid containing the particulate polymer was poured in a polytetrafluoroethylene petri dish, and dried under the conditions of 25° C. and 48 hours to prepare a powder. The powder in an amount of about 0.2 g was pressed for 2 minutes under the press conditions of 200° C. and 5 MPa to obtain a film. The obtained film was cut into a 1-cm square to obtain a test piece. The weight W0 of this test piece was measured.

After that, the test piece was immersed in a specific electrolyte solution at 60° C. for 72 hours. After that, the test piece was taken out of the electrolyte solution, and the electrolyte solution on the surface was wiped off. Then, the weight W1 of the test piece was measured.

From the obtained values of the weights W0 and W1, the swelling degree S (times) of the particulate polymer was obtained from formula S=W1/W0.

As the aforementioned specific electrolyte solution, a non-aqueous electrolyte solution obtained by dissolving a supporting electrolyte at a concentration of 1 mol/L in a specific mixed solvent was used. As the specific mixed solvent, a mixture of ethylene carbonate (EC), diethyl carbonate (DEC), and vinylene carbonate (VC) with a volume ratio: EC/DEC/VC=68.5/30/1.5 was used. As the supporting electrolyte, $LiPF_6$ was used.

(Elution Amount)

The test piece after the measurement of swelling degree was washed with methanol 5 times, and then dried. The weight W2 of the test piece after the drying was measured.

From the values of the obtained weights W0 and W2, the elution amount X (%) was obtained from formula X=(W2/W0)×100.

(Glass Transition Temperatures of Binder for Functional Layer and Particulate Polymer)

The aqueous dispersion liquid containing the binder for a functional layer and the aqueous dispersion liquid containing the particulate polymer were each dried in the environment of a humidity of 50% and a temperature of 23 to 25° C. for 3 days to obtain a film having a thickness of 1±0.3 mm. This film was dried in a hot air oven at 120° C. for 1 hour. The glass transition temperature (° C.) of this dried film as a sample was measured in accordance with JIS K7121 at a measurement temperature of −100° C. to 180° C. and a rate of temperature increase of 5° C./min, using a differential scanning calorimeter (DSC6220SII, manufactured by NanoTechnology Inc.).

(Adhesiveness of Functional Layer for Non-Aqueous Secondary Battery)

The electrodes and separators obtained in Examples and Comparative Examples were each cut out to have a cut piece of 10 mm in width×50 mm in length. As the electrode, the positive electrode was cut out in Example 14, and the negative electrode was cut out in other Examples and Comparative Examples.

The cut piece of the electrode and the cut piece of the separator were stacked. In Example 14, the cut piece of the separator was stacked on the cut piece of the positive electrode in such a manner that the separator substrate-side surface thereof (the surface on the side without a porous membrane) is brought into contact with the cut piece of the positive electrode. In Example 15, the cut piece of the separator was stacked on the cut piece of the negative electrode in such a manner that the separator substrate-side surface thereof is brought into contact with the cut piece of the negative electrode.

The cut pieces, which were stacked, were pressed using a roll press under the conditions of a load of 10 kN/m and a temperature of 80° C. to obtain a test piece in which the cut piece of the electrode and the cut piece of the separator were integrated.

A cellophane tape was fixed on a horizontal test board with the adhesive surface thereof facing upward. As the cellophane tape in this operation, a cellophane tape defined in JIS 21522 was used. The obtained test piece was bonded to the cellophane tape with the electrode-side surface of the test piece facing downward. Then, one end of the separator side of the test piece was pulled toward the vertical direction at a speed of 50 mm/min for peeling. The stress at that time was measured. The same measurement was performed three times, and the average value of the measurement results was obtained as the peel strength. On the basis of the value of the obtained peel strength, the adhesiveness was determined in accordance with the following criteria. A larger value of the peel strength is indicative of higher adhesiveness of the functional layer for a non-aqueous secondary battery.

A: Peel strength is 20 N/m or more.
B: Peel strength is 15 N/m or more and less than 20 N/m.
C: Peel strength is less than 15 N/m.

(Blocking Property)

The separator or electrode obtained in Examples and Comparative Examples was cut out to have square cut pieces of 5 cm in width×5 cm in length. As the separator and electrode, a positive electrode was cut out in Example 14, a negative electrode was cut out in Example 15, and separators were cut out in other Examples and Comparative Examples.

Two cut pieces were stacked, and subjected to the pressurization conditions of 40° C. and 10 g/cm² for 5 minutes to prepare a measurement sample.

The obtained measurement sample was left to stand for 24 hours, and then measured for blocking strength. Specifically, after the measurement sample was cut into a strip of 2 cm×5 cm, one of the two cut pieces was horizontally fixed, and the other was pulled toward the vertical direction at a speed of 50 mm/min for peeling. The stress at that time was measured. The same measurement was performed three times, and the average value of the measurement results was obtained as the blocking strength. On the basis of the value of the obtained blocking strength, the blocking property was determined in accordance with the following criteria.

A: No adhesion occurred after having been left to stand for 24 hours.
B: Blocking strength is more than 0 N/m and less than 0.25 N/m.
C: Blocking strength is 0.25 N/m or more.

(Low-Temperature Output Properties)

The 800 mAh wound type lithium ion secondary batteries produced in Examples and Comparative Examples were left to stand in the environment of 25° C. for 24 hours. Thereafter, charging was performed at a charging rate of 0.1 C for 5 hours in the environment of 25° C. After the charging was completed, the voltage $V_0$ was measured.

Subsequently, discharging was performed at a discharging rate of 1 C in the environment of −10° C. After 15 seconds from the initiation of the discharging, the voltage $V_1$ was measured. Then, the voltage change $\Delta V$ was calculated from formula $\Delta V = V_0 - V_1$.

On the basis of the value of the voltage change $\Delta V$ obtained by the calculation, the low-temperature output properties of the non-aqueous secondary battery was determined in accordance with the following criteria. A smaller value of the voltage change $\Delta V$ is indicative of better low-temperature output properties of the non-aqueous secondary battery.

A: Voltage change $\Delta V$ is less than 100 mV.
B: Voltage change $\Delta V$ is 100 mV or more and less than 200 mV.
C: Voltage change $\Delta V$ is 200 mV or more.

(Life Properties)

The 800 mAh non-aqueous secondary batteries produced in Examples and Comparative Examples were charged up to 4.2 V with a constant current of 800 mA, and then charged with a constant voltage of 4.2 V until the current value reached 20 mA, in 25° C. environment. After that, discharging was performed down to 3.0 V with a constant current of 800 mA in 25° C. environment. This charging and discharging was repeated until the discharge capacity reached 640 mAh. This time point was adopted as the lifetime of the battery. Evaluation was performed on five scales from A to E. A higher number of charging and discharging is indicative of better life properties.

A: 500 times or more
B: 450 times or more and less than 500 times
C: 400 times or more and less than 450 times
D: 300 times or more and less than 400 times
E: less than 300 times Example 1

(1-1. Preparation of Aqueous Dispersion Liquid Containing Binder for Functional Layer)

Into a reaction vessel equipped with a stirrer, 70 parts of ion exchanged water, 0.15 part of sodium lauryl sulfate (Kao Chemicals, product name "EMAL 2F") as an emulsifier, and 0.5 part of ammonium persulfate as a polymerization initiator were each supplied. Subsequently, the gas phase inside the reaction vessel was substituted with nitrogen gas, and the temperature of the liquid phase inside the reaction vessel was increased to 60° C.

Into another container, 50 parts of ion exchanged water; 0.5 part of sodium dodecylbenzenesulfonate as an emulsifier; and 94 parts of n-butyl acrylate, 2 parts of acrylonitrile, 2 parts of methacrylic acid, 1 part of N-hydroxymethylacrylamide, and 1 part of allyl glycidyl ether as polymerizable monomers were supplied and mixed, whereby a monomer mixture was obtained.

The obtained monomer mixture was continuously supplied into the reaction vessel over 4 hours for performing polymerization. While the monomer mixture was supplied, the temperature inside the reaction vessel was maintained at 60° C. After the supply of the monomer mixture was finished, the temperature was elevated to 70° C., and stirring was continued over another 3 hours. After that, the polymerization reaction was terminated. As a result, an aqueous dispersion liquid containing an acryl-based polymer as a binder for a functional layer was prepared. The glass transition temperature of the binder for a functional layer was measured. The result was −11° C.

(1-2. Preparation of Particulate Polymer for Functional Layer)

Into a 5 MPa pressure resistant container equipped with a stirrer, a monomer composition, 1 part of sodium dodecylbenzenesulfonate as an emulsifier, 150 parts of ion exchanged water, and 0.5 part of potassium persulfate as a polymerization initiator were charged. The mixture was sufficiently stirred, and then warmed to 60° C. The monomer composition was prepared as a composition containing 75 parts of styrene (St), 20 parts of n-butyl acrylate (BA), 4 parts of methacrylic acid (MAA), and 1 part of ethylene glycol dimethacrylate (EDMA). In this manner, the polymerization of the polymerizable monomers was initiated. At the time point when the polymerization conversion rate reached 96%, the reaction medium was cooled to stop the polymerization reaction. As a result, an aqueous dispersion liquid containing a particulate polymer was prepared.

The volume-average particle diameter D, swelling degree S, and elution amount X of the obtained particulate polymer were measured. Also, the glass transition temperature of the particulate polymer was measured. The result was 60° C.

(1-3. Preparation of Slurry Composition for Functional Layer)

Using a ball mill, 80 parts by weight in terms of solid content of alumina (manufactured by Sumitomo Chemical Co., Ltd., product name "AKP3000", volume-average particle diameter: 0.5 μm, density: 3.9 g/cm$^3$) as inorganic particles; 20 parts by weight in terms of solid content of the aqueous dispersion liquid of the particulate polymer obtained in (1-2); 5 parts by weight in terms of solid content of the aqueous dispersion liquid of the binder for a functional layer obtained in (1-1); 1.5 parts by weight of polyacrylamide (PAAm) as a thickener; 0.8 part by weight of sodium polyacrylate (product name: Aqualic GL366, manufactured by Nippon Shokubai Co., Ltd.) as a dispersant; and ion exchanged water in such an amount that the solid content concentration in the reaction medium becomes 40% were mixed. As a result, a slurry composition for a functional layer was prepared.

(1-4. Production of Separator)

A separator substrate composed of three layers that are polypropylene/polyethylene/polypropylene (separator thickness: 25 μm, product name "Celgard 2325") was prepared as a separator substrate. Onto one surface of this separator substrate, the slurry composition for a functional layer obtained in (1-3) was applied such that the thickness of the coating film became 2 μm. After that, the coating film was dried at 50° C. for 10 minutes. Thus, a functional layer for a non-aqueous secondary battery was formed on one surface of the separator substrate. Subsequently, another functional layer for a non-aqueous secondary battery was formed also on the other surface of the separator substrate by the same operation as the aforementioned operation. Accordingly, a separator including the separator substrate and the functional layers for a non-aqueous secondary battery disposed on both surfaces of the separator substrate was obtained. The thickness of the functional layer of each layer in the obtained separator was 2 μm. The obtained separator was evaluated for blocking properties.

(1-5. Production of Negative Electrode: Preparation of Binder for Negative Electrode)

A mixed liquid of: 61.5 parts of styrene, 35 parts of 1,3-butadiene, and 3.5 parts of itaconic acid as polymerizable monomers; 0.25 part of t-dodecyl mercaptan as a chain transfer agent; and 0.35 part of sodium lauryl sulfate as an emulsifier was prepared. The mixed liquid was supplied from a container containing the mixed liquid to a pressure resistant container. Simultaneously with the supply, 1 part of potassium persulfate as a polymerization initiator was added into the pressure resistant container. As a result, the polymerization reaction of the polymerizable monomers was initiated. The temperature during the polymerization reaction was maintained at 75° C.

After 5.5 hours from the initiation of the polymerization, addition of the entire amount of the aforementioned polymerizable monomers was completed. Subsequently, the reaction system was warmed to 85° C. to continue the polymerization reaction. At the time point when the polymerization conversion rate reached 97% (after 6 hours from the initiation of the polymerization reaction at 85° C.), the reaction medium was cooled to stop the reaction. As a result, a mixture containing a particulate polymer was obtained. To the obtained mixture containing the particulate polymer, a 5% aqueous sodium hydroxide solution was added to adjust the pH of the mixture to 8. After that, distillation by heat and reduced pressure was performed to remove unreacted monomers. After that, the mixture was cooled, whereby an aqueous dispersion liquid (solid content concentration: 40%) containing a styrene-butadiene copolymer as a binder for a negative electrode was obtained.

(1-6. Production of Negative Electrode: Preparation of Slurry Composition for Negative Electrode)

97 parts of artificial graphite (volume-average particle diameter: 15.6 μm) as a negative electrode active material and 1 part in terms of solid content of a 2% aqueous solution of sodium carboxymethyl cellulose salt (manufactured by Nippon Paper Industries Co., Ltd., product name "MAC350HC") as a thickener were mixed. To the mixture, ion exchanged water was added to adjust the solid content concentration to 68%. After that, the obtained product was stirred at a temperature of 25° C. for 60 minutes to obtain a mixed liquid. To the obtained mixed liquid, ion exchanged water was further added to adjust the solid content concentration to 62%. After that, the obtained product was stirred at a temperature of 25° C. for 15 minutes.

To the mixed liquid, 2 parts in terms of solid content of the aqueous dispersion liquid containing a binder for a negative electrode obtained in (1-5) was added, and ion exchanged water was added to obtain a final solid content concentration of 52%. The obtained product was continuously stirred for 10 minutes to obtain a polymer mixed liquid. The polymer mixed liquid was subjected to a defoaming treatment under reduced pressure to obtain a slurry composition for a negative electrode.

(1-7. Production of Negative Electrode: Formation of Negative Electrode Mixture Layer)

The slurry composition for a negative electrode obtained in (1-6) was applied onto one surface of a copper foil (thickness: 20 μm) as a current collector for a negative electrode using a comma coater such that the film thickness after drying became about 150 μm. Subsequently, the copper foil coated with the slurry composition for a negative electrode was conveyed at a speed of 0.5 m/min in an oven at 60° C. over 2 minutes, so that the slurry composition for a negative electrode was dried. After that, the copper foil coated with the slurry composition for a negative electrode was subjected to a heating treatment at a temperature of 120° C. for 2 minutes. As a result, a negative electrode mixture layer was formed on one surface of the current collector for a negative electrode. Subsequently, the same operation was performed also to the other surface of the current collector for a negative electrode to obtain a primary negative electrode containing the current collector for a negative electrode and the negative electrode mixture layer provided on both surfaces of the current collector for a negative electrode. The primary negative electrode was rolled by a roll press to thereby obtain a negative electrode in which each of the negative electrode mixture layers on both sides has a thickness of 80 μm. The obtained negative electrode and the separator obtained in (1-4) were evaluated for the adhesiveness of the separator to the electrode.

(1-8. Production of Positive Electrode: Preparation of Slurry Composition for Positive Electrode)

94 parts of NMC (LiNi$_{0.8}$Co$_{0.1}$Mn$_{0.1}$O$_2$, volume-average particle diameter: 10 μm) as a positive electrode active material; 3 parts of acetylene black (manufactured by Denki Kagaku Kogyo Kabushiki Kaisha, product name "HS-100") as an electroconductive material; and 3 parts in terms of solid content of polyvinylidene fluoride (manufactured by Kureha Corporation, product name "#7208") as a binder for a positive electrode were mixed. To the mixture, N-methylpyrrolidone was added as a solvent to obtain a mixed liquid in which the total solid content concentration was adjusted to 70%. The mixed liquid was mixed by a planetary mixer, whereby a slurry composition for a positive electrode was obtained.

(1-9. Production of Positive Electrode: Formation of Positive Electrode Mixture Layer)

The slurry composition for a positive electrode obtained in (1-8) was applied onto one surface of an aluminum foil (thickness: 20 μm) as a current collector for a positive electrode using a comma coater such that the film thickness after drying became about 150 μm. Subsequently, the aluminum foil coated with the slurry composition for a positive electrode was conveyed at a speed of 0.5 m/min in an oven at 60° C. over 2 minutes, so that the slurry composition for a positive electrode was dried. After that, the aluminum foil coated with the slurry composition for a positive electrode was subjected to a heating treatment at a temperature of 120° C. for 2 minutes. As a result, a positive electrode mixture layer was formed on one surface of the current collector for a positive electrode. Subsequently, the same operation was performed also to the other surface of the current collector for a positive electrode to obtain a primary positive electrode containing the current collector for a positive electrode and the positive electrode mixture layer provided on both surfaces of the current collector for a positive electrode. The primary positive electrode was rolled by a roll press to thereby obtain a positive electrode in which each of the positive electrode mixture layers on both sides has a thickness of 60 μm.

(1-10. Production of Non-Aqueous Secondary Battery)

The positive electrode obtained in (1-9) was cut out to obtain a rectangular positive electrode of 49 cm×5.0 cm. The separator obtained in (1-4) was cut out to obtain two rectangular separators of 55 cm×5.5 cm. Also, the negative electrode obtained in (1-7) was cut out to obtain a rectangular negative electrode of 50 cm×5.2 cm.

These were stacked to obtain a stacked body having the layer structure of (rectangular positive electrode)/(rectangular separator)/(rectangular negative electrode)/(rectangular separator).

The obtained stacked body was wound from an end in lengthwise direction by a winding machine to obtain a wound body. Furthermore, the wound body was pressed under the press conditions of a temperature of 70° C. and a pressure of 1.0 MPa for 8 seconds to obtain a flat body.

Then, the flat body was wrapped in an aluminum package as a sheathing material for a non-aqueous secondary battery. Subsequently, a space formed by the aluminum package was filled with an electrolyte solution (electrolyte: $LiPF_6$ at a concentration of 1 M, solvent: ethylene carbonate (EC)/diethyl carbonate (DEC)/vinylene carbonate (VC)=68.5/30/1.5 (volume ratio)) in such a manner that the air does not remain. Furthermore, the opening of the aluminum package was heat sealed at 150° C. to seal and close the opening of the aluminum sheath. As a result, a wound type lithium ion secondary battery (I) was produced as a non-aqueous secondary battery. The capacity of this non-aqueous secondary battery was 800 mAh.

The obtained non-aqueous secondary battery was evaluated for low-temperature output properties and life properties.

Example 2

A non-aqueous secondary battery and its constituent elements were produced and evaluated by the same operation as that in Example 1 except that the following matter was changed.

The monomer composition in (1-2) was changed to a composition containing 80 parts of styrene (St), 15 parts of n-butyl acrylate (BA), 4 parts of methacrylic acid (MAA), and 1 part of ethylene dimethacrylate (EDMA).

Example 3

A non-aqueous secondary battery and its constituent elements were produced and evaluated by the same operation as that in Example 1 except that the following matter was changed.

The monomer composition in (1-2) was changed to a composition containing 55 parts of styrene (St), 40 parts of n-butyl acrylate (BA), 4 parts of methacrylic acid (MAA), and 1 part of ethylene dimethacrylate (EDMA).

Example 4

A non-aqueous secondary battery and its constituent elements were produced and evaluated by the same operation as that in Example 1 except that the following matter was changed.

The monomer composition in (1-2) was changed to a composition containing 20 parts of styrene (St), 75 parts of n-butyl acrylate (BA), 4 parts of methacrylic acid (MAA), and 1 part of ethylene dimethacrylate (EDMA).

Example 5

A non-aqueous secondary battery and its constituent elements were produced and evaluated by the same operation as that in Example 1 except that the following matter was changed.

The monomer composition in (1-2) was changed to a composition containing 75.99 parts of styrene (St), 20 parts of n-butyl acrylate (BA), 4 parts of methacrylic acid (MAA), and 0.01 part of ethylene dimethacrylate (EDMA).

Example 6

A non-aqueous secondary battery and its constituent elements were produced and evaluated by the same operation as that in Example 1 except that the following matter was changed.

The monomer composition in (1-2) was changed to a composition containing 75 parts of styrene (St), 20 parts of n-butyl acrylate (BA), 3 parts of methacrylic acid (MAA), and 2 part of ethylene dimethacrylate (EDMA).

Example 7

A non-aqueous secondary battery and its constituent elements were produced and evaluated by the same operation as that in Example 1 except that the following matter was changed.

The monomer composition in (1-2) was changed to a composition containing 75 parts of styrene (St), 20 parts of n-butyl acrylate (BA), 4.6 parts of methacrylic acid (MAA), and 0.4 part of allyl methacrylate (AMA).

Example 8

A non-aqueous secondary battery and its constituent elements were produced and evaluated by the same operation as that in Example 1 except that the following matter was changed.

The amount of the emulsifier in (1-2) was changed to 1.2 parts, to thereby adjust the volume-average particle diameter D of the obtained particulate polymer to 0.5 μm.

Example 9

(9-1. Preparation of Particulate Polymer for Functional Layer)

Into a 5 MPa pressure resistant container equipped with a stirrer, a monomer composition, 1.2 parts of sodium dodecylbenzenesulfonate as an emulsifier, 150 parts of ion exchanged water, and 0.5 part of potassium persulfate as a polymerization initiator were charged. The mixture was sufficiently stirred, and then warmed to 60° C. The monomer composition was prepared as a composition containing 75 parts of styrene (St), 20 parts of n-butyl acrylate (BA), 4 parts of methacrylic acid (MAA), and 1 part of ethylene glycol dimethacrylate (EDMA). In this manner, the polymerization of the polymerizable monomers was initiated. At the time point when the polymerization conversion rate reached 96%, the reaction medium was cooled to stop the polymerization reaction. As a result, an aqueous dispersion liquid containing seed particles was prepared.

An additional monomer composition was further added to the aqueous solution of the seed particles. The additional monomer composition was prepared as a composition containing 75,000 parts of styrene (St), 20,000 parts of n-butyl acrylate (BA), 4,000 parts of methacrylic acid (MAA), and 1,000 parts of ethylene glycol dimethacrylate (EDMA). The mixture was sufficiently stirred, and then warmed to 60° C. In this manner, the polymerization of the polymerizable monomers was initiated. At the time point when the polymerization conversion rate reached 96%, the reaction medium was cooled to stop the polymerization reaction. As a result, an aqueous dispersion liquid containing a particulate polymer having a volume-average particle diameter of 5.0 μm was prepared.

The volume-average particle diameter D, swelling degree S, elution amount X, and glass transition temperature of the obtained particulate polymer were measured.

(9-2. Production and Evaluation of Non-Aqueous Secondary Battery etc.)

A non-aqueous secondary battery and its constituent elements were produced and evaluated by the same operation as that in (1-1) and (1-3) to (1-10) of Example 1 except that the following matter was changed.

The product obtained in (9-1) was used instead of that obtained in (1-2) as the aqueous dispersion liquid of the particulate polymer.

Example 10

A non-aqueous secondary battery and its constituent elements were produced and evaluated by the same operation as that in Example 1 except that the following matters were changed.

No inorganic particles were used in (1-3).

The amount of the particulate polymer used in (1-3) was changed to 100 parts by weight.

Example 11

A non-aqueous secondary battery and its constituent elements were produced and evaluated by the same operation as that in Example 1 except that the following matters were changed.

In (1-3), 76 parts by weight of boehmite ("(trade name) BMM" manufactured by Kawai Lime Industry Co., Ltd.; number-average particle diameter 0.9 μm; density 3.5 g/cm$^3$; (hydrate of aluminum oxide: AlOOH)) was used instead of 80 parts by weight of alumina as inorganic particles.

The amount of the particulate polymer used in (1-3) was changed to 24 parts by weight.

Example 12

A non-aqueous secondary battery and its constituent elements were produced and evaluated by the same operation as that in Example 1 except that the following matters were changed.

The amount of the inorganic particles used in (1-3) was changed to 49 parts by weight.

The amount of the particulate polymer used in (1-3) was changed to 51 parts by weight.

Example 13

A non-aqueous secondary battery and its constituent elements were produced and evaluated by the same operation as that in Example 1 except that the following matters were changed.

The amount of the inorganic particles used in (1-3) was changed to 94 parts by weight.

The amount of the particulate polymer used in (1-3) was changed to 6 parts by weight.

Example 14

(14-1. Preparation of Positive Electrode Having Functional Layer)

The slurry composition for a functional layer obtained in (1-3) was applied onto one surface of the positive electrode obtained in (1-9) of Example 1 such that the thickness thereof became 2 μm. Thereafter, it was dried at 50° C. for 10 minutes. Accordingly, a functional layer for a non-aqueous secondary battery was formed on one surface of the positive electrode. Subsequently, the functional layer for a non-aqueous secondary battery was also formed on the other surface of the positive electrode by the same operation as the aforementioned operation. Accordingly, a positive electrode having a functional layer which included a current collector, a positive electrode mixture layer disposed on both surfaces of the current collector, and a functional layer for a non-aqueous secondary battery disposed on each of the positive electrode mixture layers was obtained. In the obtained positive electrode having a functional layer, the thickness of each of the functional layers was 2.0 μm. The obtained positive electrode having a functional layer was evaluated for blocking properties.

(14-2. Preparation of Separator)

A separator having a functional layer for a non-aqueous secondary battery was obtained by the same operation as that of (1-4) in Example 1 except that the functional layer for a non-aqueous secondary battery was formed not on both surfaces but on only one surface of the separator substrate. The obtained separator had a separator substrate and a functional layer for a non-aqueous secondary battery disposed on only one surface of the separator substrate. The obtained separator and the positive electrode obtained in (14-1) were evaluated for adhesiveness.

(14-3. Production of Non-Aqueous Secondary Battery)

A non-aqueous secondary battery was produced and evaluated by the same operation as that of (1-10) in Example 1 except that the following matters were changed.

The positive electrode having a functional layer obtained in (14-1) was used instead of the positive electrode obtained in (1-9).

The separator obtained in (14-2) was used instead of the separator obtained in (1-4).

In a stacked body having the layer structure of (rectangular positive electrode)/(rectangular separator)/(rectangular negative electrode)/(rectangular separator), the direction of the rectangular separator was such that the functional layer-side surface thereof faced the rectangular negative electrode.

Example 15

(15-1. Preparation of Negative Electrode Having Functional Layer)

The slurry composition for a functional layer obtained in (1-3) of Example 1 was applied onto one surface of the negative electrode obtained in (1-7) of Example 1 such that the thickness thereof became 2 μm. Thereafter, it was dried at 50° C. for 10 minutes. Accordingly, a functional layer for a non-aqueous secondary battery was formed on one surface of the negative electrode. Subsequently, the functional layer for a non-aqueous secondary battery was also formed on the other surface of the negative electrode by the same operation as the aforementioned operation. Accordingly, a negative electrode having a functional layer which included a current collector, a negative electrode mixture layer disposed on both surfaces of the current collector, and a functional layer for a non-aqueous secondary battery disposed on each of the negative electrode mixture layers was obtained. In the obtained negative electrode having a functional layer, the thickness of each functional layer was 2.0 μm. The obtained negative electrode having a functional layer was evaluated for blocking properties.

(15-2. Production of Non-Aqueous Secondary Battery)

A non-aqueous secondary battery and its constituent elements were produced and evaluated by the same operation as that of (1-10) in Example 1 except that the following matters were changed.

The negative electrode having a functional layer obtained in (15-1) was used instead of the negative electrode obtained in (1-7).

The separator obtained in (14-2) of Example 14 was used instead of the separator obtained in (1-4). The evaluation for adhesiveness was performed on the obtained separator and the positive electrode obtained in (15-1).

In a stacked body having the layer structure of (rectangular positive electrode)/(rectangular separator)/(rectangular negative electrode)/(rectangular separator), the direction of the rectangular separator was such that the separator substrate-side surface thereof faced the rectangular negative electrode.

Comparative Example 1

A non-aqueous secondary battery and its constituent elements were produced and evaluated by the same operation as that in Example 1 except that the following matter was changed.

The monomer composition in (1-2) was changed to a composition containing 75 parts of styrene (St), 20 parts of n-butyl acrylate (BA), and 4 parts of methacrylic acid (MAA) (ethylene dimethacrylate was not used).

Comparative Example 2

A non-aqueous secondary battery and its constituent elements were produced and evaluated by the same operation as that in Example 1 except that the following matter was changed.

The monomer composition in (1-2) was changed to a composition containing 85.9 parts of styrene (St), 10 parts of n-butyl acrylate (BA), 4 parts of methacrylic acid (MAA), and 0.1 part of allyl methacrylate (AMA).

Comparative Example 3

A non-aqueous secondary battery and its constituent elements were produced and evaluated by the same operation as that in Example 1 except that the following matter was changed.

The monomer composition in (1-2) was changed to a composition containing 15.9 parts of styrene (St), 80 parts of n-butyl acrylate (BA), 4 parts of methacrylic acid (MAA), and 0.1 part of allyl methacrylate (AMA).

The obtained measurement results and evaluation results of Examples 1 to 15 and Comparative Examples 1 to 3 are shown in the following Tables 1 to 3.

In Tables 1 to 3, meanings of the abbreviations are as follows.

St: use amount (part) of styrene

BA: use amount (part) of n-butyl acrylate

MMA: use amount (part) of methyl methacrylate

EDMA: use amount (part) of ethylene dimethacrylate

AMA: use amount (part) of allyl methacrylate

Particle Tg: glass transition temperature (° C.) of the particulate polymer

Inorganic particles: use amount (part) of the inorganic particles in preparation of the slurry composition for a functional layer. As to Example 1, the use amount of boehmite. As to others, the use amount of alumina.

Particulate polymer: use amount (part) of the particulate polymer in preparation of the slurry composition for a functional layer Swelling degree S: measured value of the swelling degree for the solid content of the slurry composition for a functional layer Elution amount X: measured value of the elution amount for the solid content of the slurry composition for a functional layer D50: D50 value obtained from the measurement result of the volume-average particle diameter D of the inorganic particles Adhesiveness: evaluation result for the adhesiveness of the functional layer for a non-aqueous secondary battery Blocking properties: evaluation result for the blocking properties of the separator or electrode. As to Example 14, the evaluation result of the positive electrode. As to Example 15, the evaluation result of the negative electrode. As to others, the evaluation result of the separator.

Low output properties: evaluation result for the low-temperature output properties of the non-aqueous secondary battery Life properties: evaluation result for the life properties of the non-aqueous secondary battery

TABLE 1

|  | Ex. 1 | Ex. 2 | Ex. 3 | Ex. 4 | Ex. 5 | Ex. 6 |
| --- | --- | --- | --- | --- | --- | --- |
| St (parts) | 75 | 80 | 55 | 20 | 75.99 | 75 |
| BA (parts) | 20 | 15 | 40 | 75 | 20 | 20 |
| MAA (parts) | 4 | 4 | 4 | 4 | 4 | 3 |
| EDMA (parts) | 1 | 1 | 1 | 1 | 0.01 | 2 |
| AMA (parts) | 0 | 0 | 0 | 0 | 0 | 0 |
| Particle Tg (° C.) | 60 | 70 | 21 | −27 | 60 | 60 |
| Swelling degree S (times) | 2.0 | 1.9 | 2.2 | 2.5 | 3.0 | 1.5 |
| Elution amount X (%) | 0.5 | 1.0 | 1.0 | 1.0 | 2.0 | 0.1 |
| D50 (μm) | 0.6 | 0.6 | 0.6 | 0.6 | 0.6 | 0.6 |
| Inorganic particles (parts) | 80 | 80 | 80 | 80 | 80 | 80 |
| Particulate polymer (parts) | 20 | 20 | 20 | 20 | 20 | 20 |
| Adhesiveness | A | B | A | B | A | B |
| Blocking property | A | A | B | C | B | A |
| Low-temperature output property | A | A | A | A | B | B |
| Life property | A | A | A | A | A | B |

TABLE 2

|  | Ex. 7 | Ex. 8 | Ex. 9 | Ex. 10 | Ex. 11 | Ex. 12 |
| --- | --- | --- | --- | --- | --- | --- |
| St (parts) | 75 | 75 | 75 | 75 | 75 | 75 |
| BA (parts) | 20 | 20 | 20 | 20 | 20 | 20 |
| MAA (parts) | 4.6 | 4 | 4 | 4 | 4 | 4 |
| EDMA (parts) | 0 | 1 | 1 | 1 | 1 | 1 |
| AMA (parts) | 0.4 | 0 | 0 | 0 | 0 | 0 |
| Particle Tg (° C.) | 60 | 60 | 60 | 60 | 60 | 60 |
| Swelling degree S (times) | 1.5 | 2.0 | 2.0 | 2.0 | 2.0 | 2.0 |
| Elution amount X (%) | 0.1 | 0.5 | 0.5 | 0.5 | 0.5 | 0.5 |
| D50 (μm) | 0.6 | 0.5 | 5.0 | 0.6 | 0.6 | 0.6 |
| Inorganic particles (parts) | 80 | 80 | 80 | 0 | 76 | 49 |
| Particulate polymer (parts) | 20 | 20 | 20 | 100 | 24 | 51 |
| Adhesiveness | A | A | A | A | A | A |
| Blocking property | A | A | B | B | A | B |
| Low-temperature output property | A | B | B | B | B | C |
| Life property | A | A | A | B | A | B |

TABLE 3

|  | Ex. 13 | Ex. 14 | Ex. 15 | Comp. Ex. 1 | Comp. Ex. 2 | Comp. Ex. 3 |
| --- | --- | --- | --- | --- | --- | --- |
| St (parts) | 75 | 75 | 75 | 75 | 85.9 | 15.9 |
| BA (parts) | 20 | 20 | 20 | 20 | 10 | 80 |
| MAA (parts) | 4 | 4 | 4 | 4 | 4 | 4 |
| EDMA (parts) | 1 | 1 | 1 | 0 | 0 | 0 |
| AMA (parts) | 0 | 0 | 0 | 0 | 0.1 | 0.1 |
| Particle Tg (° C.) | 60 | 60 | 60 | 60 | 82 | −32 |
| Swelling degree S (times) | 2.0 | 2.0 | 2.0 | 12 | 1.8 | 2.6 |
| Elution amount X (%) | 0.5 | 0.5 | 0.5 | 12 | 1.0 | 2.5 |
| D50 (μm) | 0.6 | 0.6 | 0.6 | 0.6 | 0.6 | 0.6 |
| Inorganic particles (parts) | 94 | 80 | 80 | 80 | 80 | 80 |
| Particulate polymer (parts) | 6 | 20 | 20 | 20 | 20 | 20 |
| Adhesiveness | B | A | A | C | C | C |
| Blocking property | A | A | A | C | B | C |
| Low-temperature output property | A | B | B | C | B | B |
| Life property | A | A | A | E | E | E |

(Discussion)

As understood from the results of Table 1 to Table 3, in Examples in which the particulate polymer satisfies the requirements of the present invention, excellent results of adhesiveness, blocking properties, low-temperature output properties, and life properties which are balanced well can be obtained. On the contrary, in Comparative Example 1 in which the swelling degree is outside the range defined by the present invention, and Comparative Examples 2 and 3 in which the composition of monomer units is outside the range defined by the present invention, evaluation results inferior to Examples were obtained.

The invention claimed is:

1. A composition for a non-aqueous secondary battery functional layer comprising a particulate polymer, wherein
    the particulate polymer is a copolymer containing
        20% by weight or more and 80% by weight or less of an aromatic monovinyl monomer unit; and
        0.01% by weight or more and 2% by weight or less of a polyvalent ethylenically unsaturated crosslinkable monomer unit,
    a volume-average particle diameter D of the particulate polymer is 0.5 μm or more and 5 μm or less,
    a swelling degree of the particulate polymer to an electrolyte solution is more than 1 time and 3 times or less, and
    the particulate polymer has only one glass transition temperature and the only one glass transition temperature of the particulate polymer is 20° C. or higher.

2. The composition for the non-aqueous secondary battery functional layer according to claim 1, wherein an elution amount of the particulate polymer to the electrolyte solution is 0.01% by weight or more and 10% by weight or less.

3. The composition for the non-aqueous secondary battery functional layer according to claim 1, further comprising inorganic particles.

4. A functional layer for a non-aqueous secondary battery formed using the composition for the non-aqueous secondary battery functional layer according to claim 1.

5. A non-aqueous secondary battery comprising a positive electrode, a negative electrode, a separator, and an electrolyte, wherein one or more of the positive electrode, the negative electrode, and the separator have the functional layer for the non-aqueous secondary battery according to claim 4.

6. A functional layer for the non-aqueous secondary battery comprising
  a particulate polymer, wherein the particulate polymer is
    a copolymer containing
      20% by weight or more and 80% by weight or less of an aromatic monovinyl monomer unit; and
      0.01% by weight or more and 2% by weight or less of a polyvalent ethylenically unsaturated crosslinkable monomer unit,
  a volume-average particle diameter of the particulate polymer is 0.5 μm or more and 5 μm or less,
  a swelling degree of the particulate polymer to a specific electrolyte solution is more than 1 time and 3 times or less, and
  the particulate polymer has only one glass transition temperature and the only one glass transition temperature of the particulate polymer is 20° C. or higher.

7. The composition for the non-aqueous secondary battery functional layer according to claim 1, wherein the particulate polymer further contains 5% by weight or more and 20% by weight or less of a (meth)acrylic acid alkyl ester monomer unit.

8. The functional layer for the non-aqueous secondary battery according to claim 6, wherein the particulate polymer further contains 5% by weight or more and 20% by weight or less of a (meth)acrylic acid alkyl ester monomer unit.

* * * * *